United States Patent [19]

Beck

[11] 4,444,229

[45] Apr. 24, 1984

[54] SLURRY CONCENTRATION APPARATUS

[75] Inventor: Jeffrey L. Beck, Ponca City, Okla.

[73] Assignee: Conoco Inc., Ponca City, Okla.

[21] Appl. No.: 264,917

[22] Filed: May 18, 1981

[51] Int. Cl.³ .......................................... B65B 31/00
[52] U.S. Cl. .................................. 141/1; 141/65;
    141/67; 37/58; 55/205; 210/788; 210/512.1;
    406/96; 417/171
[58] Field of Search .................. 417/54, 65, 171, 194;
    141/67, 1–12, 37–66; 406/96, 93, 109, 152, 153;
    37/58, 195; 210/787, 788, 304, 512.1, 512.2;
    55/205

[56] References Cited

U.S. PATENT DOCUMENTS

| | | | |
|---|---|---|---|
| 3,557,956 | 1/1971 | Braun et al. | 210/788 |
| 3,684,093 | 8/1972 | Kono et al. | 210/788 |
| 3,797,661 | 3/1974 | Buzga | 55/205 |
| 4,297,111 | 10/1981 | Ross | 210/788 |

FOREIGN PATENT DOCUMENTS 521619 8/1953 Belgium ............................. 55/205

659745 3/1963 Canada ............................. 55/205

Primary Examiner—Houston S. Bell, Jr.
Attorney, Agent, or Firm—William J. Miller

[57] ABSTRACT

An apparatus for increasing the solids to fluids ratio of a slurry is constructed from a chamber which has a substantially circular cross section with a high pressure slurry inlet mounted through said chamber wall with the axis of the inlet normal to a diameter of the chamber. A high pressure slurry outlet is mounted through the chamber wall with the axis normal to a chamber cross section. A low pressure outlet is mounted through the chamber wall with its axis substantially aligned with the axis of the circular cross section so that a certain portion of the fluid entering the high pressure inlet will exit the low pressure outlet. The amount is controlled by a valve inserted in the low pressure outlet. The fluid is preferably of the type which operated by reducing its diameter. Anticavitation may be provided for the chamber by passing air from the outside of the chamber into the chamber when the pressure in the chamber becomes less than the air pressure outside the chamber.

9 Claims, 2 Drawing Figures

SLURRY CONCENTRATION APPARATUS

RELATED APPLICATIONS

Application Ser. No. 140,516 filed April 15, 1980, entitled "Pressure Dissipation Device" by Jeffrey L. Beck and William T. Sweeney, now U.S. Pat. No. 4,333,499; application Ser. No. 218,857 filed Dec. 22, 1980, entitled "Vortex Injection Method and Apparatus" by Jeffrey L. Beck; and application Ser. No. 231,637 filed Feb. 5, 1981, entitled "Dredging Apparatus" by Jeffrey L. Beck, now U.S. Pat. No. 4,409,746 are related to this application.

BACKGROUND OF THE INVENTION

In application Ser. No. 140,516 an apparatus is disclosed for dissipating the pressure of a confined fluid having a housing with a sidewall in a substantially circular cross-sectional configuration with a top and bottom. Inlet means is formed into the sidewall so that the axis of the inlet is tangent to a diameter of the sidewall. An outlet extends through the bottom and an opening extends through the top. High pressure fluids entering the inlet form a vortex around the sidewall and between the top and the bottom and pass out the outlet under low pressure. Air is introduced through the openings in the top to prevent cavitation within the housing. A device may be coupled to the outlet to reduce the velocity of the fluids leaving the outlet.

In application Ser. No. 218,857 a method and apparatus are disclosed for injecting a low pressure slurry into a high pressure stream to form a high pressure slurry by injecting a high pressure fluid into a chamber. A portion of the high pressure fluid is removed at a certain location in the chamber, to form a fluid low pressure vortex. The low pressure slurry is injected into the low pressure vortex where it mixes with the high pressure fluids. The slurry, at a high pressure, is removed from a high pressure outlet.

BRIEF DESCRIPTION OF THE INVENTION

This invention describes a system for removing water from a slurry in order to increase the concentration of the slurry. The system operates by injecting the high pressure fluid into and out of a substantially circular chamber while letting part of the fluid exit under low pressure from an outlet mounted with its axis parallel to the axis of the circular chamber. The amount of fluid that is permitted to exit is controlled by a valve mounted in series with the low pressure outlet. The particular valve used provides a uniform reduction of diameter upon closure. The valve operates most efficiently since the fluid is driven around the outside of the pipe at a high velocity. In case a pressure reduction is developed inside the chamber, an apparatus comprising a check valve, permits air to enter the chamber, thereby equalizing the air between the outside and inside of the chamber wall, thereby preventing cavitation. Apparatus is also provided to measure the concentration of the slurry at the high pressure outlet and communicate that information to the control valve so that the control valve will tend to maintain the slurry concentration at a predetermined or preset level.

DETAILED DESCRIPTION OF THE INVENTION

Figure 1:
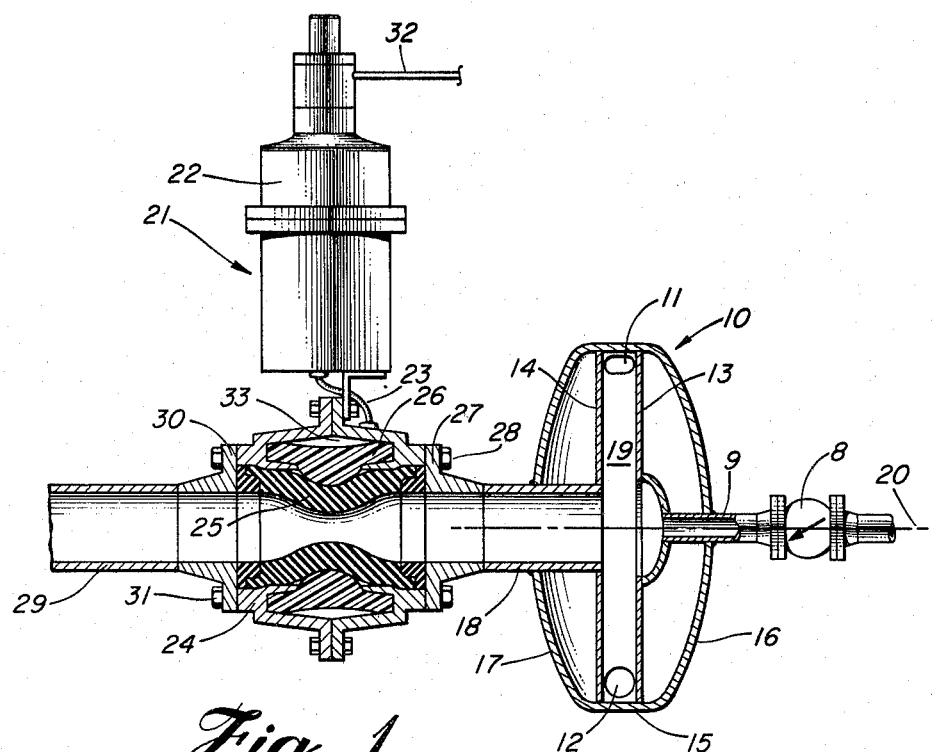
FIG. 1 is a partial cross-sectional view of the valve and chamber operating it as a slurry concentration apparatus and FIG. 2 is a method for incorporating the slurry concentration apparatus in a dredging operation.

Referring to both of the figures but in particular to FIG. 1, a slurry concentration apparatus is illustrated and essentially comprises a chamber generally referred to by arrow 10 which has a high pressure inlet 11 and a high pressure outlet 12. Chamber 10 is generally formed by two sidewalls 13 and 14 and an endwall 15. For ease in construction and for strengthening the chamber, a generally dome-shaped enclosure 16 is formed over sidewall 13, and a second dome-shaped enclosure 17 is formed over sidewall 14. A low pressure outlet 18 comprises a pipe which is mounted through dome-shaped enclosure 17 and sidewall 14 so that it can communicate within the chamber 19 formed between the sidewalls 14 and 13. Chamber 19 is generally circular in cross section but can have other configurations and has an axis 20 which is substantially aligned with the axis of low pressure outlet 18.

The control valve generally referred to by arrow 21 includes a control unit 22 and a hydraulic control output 23 coupled to a valve body 24. Valve body 24 comprises an inner rubber sleeve 25 which is controlled by a rubber muscle 26. Rubber muscle 26 has its upper surface communicating with a hydraulic reservoir 33 which is coupled to hydraulic control output 23. Valve body 24 is connected to low pressure outlet 18 in the usual manner, such as a flange 27 and bolts 28. The valve outlet pipe 29 is, likewise, coupled to valve body 24 by a flange 30 and bolts 31. Control valve 21 has an electrical inlet 32 into control unit 22.

The actual control valve 21, as illustrated, is well known in the art. One type of such valve is made by the Clarkson Company, Palo Alto, Calif., and is described as a Clarkson series "C" valve. The Clarkson valve has been described as being hydraulically actuated but pneumatic actuation is an equal alternative. The valve basically operates by electrical information being provided through cable 32 to the interior of the valve where an electrical hydraulic control circuit applies hydraulic pressure to the hydraulic control output 23. The fluid is connected to the reservoir 33 in valve body 24 where pressure is applied against rubber muscle 26. Muscle 26 causes an inward deformation of the rubber sleeve 25 which tends to close down the valve with a venturi like effect, causing a restriction to the passage of fluids through the valve, and an increase in pressure on the low pressure outlet 18 side of valve 21.

With the understanding of the valve the slurry concentrator operates in the following manner: High pressure slurry entering high pressure inlet 11 rotates around chamber 19 with most of the high pressure slurry leaving high pressure outlet 12. The fluid will then exit low pressure outlet 18 along the outside walls as a low pressure fluid with extremely high velocity. The velocity will be directly related to the pressure at 18 and the pressure at inlet 11. As the fluid moves into valve body 24 its passage through sleeve 25 will be dependent upon the amount of closure of rubber sleeve 25, that is, if rubber sleeve 25 is fully open thereby having the same internal diameter as low pressure outlet 18, the pressure differential will only be frictional loss across the valve. If, however, a signal through wire 32 to control unit 22 indicates that less fluid should be exiting low pressure outlet 18, then either pneumatic or hydraulic fluid will pass through outlet 23 into reservoir 33 which applies fluid pressure against rubber muscle 26, causing the rubber sleeve 25 to deform inwardly. As described, this will create an increase in pressure at the low pressure outlet 18 which will reduce the amount of fluid flowing from chamber 19 into 18 thus increasing the amount of fluid that may be exiting high pressure outlet 12. If concentration at outlet 12 is monitored and the variations are communicated through 32 to control unit 22, concentration can be maintained within fairly narrow limits. Such a control is illustrated in FIG. 2.

Figure 2:
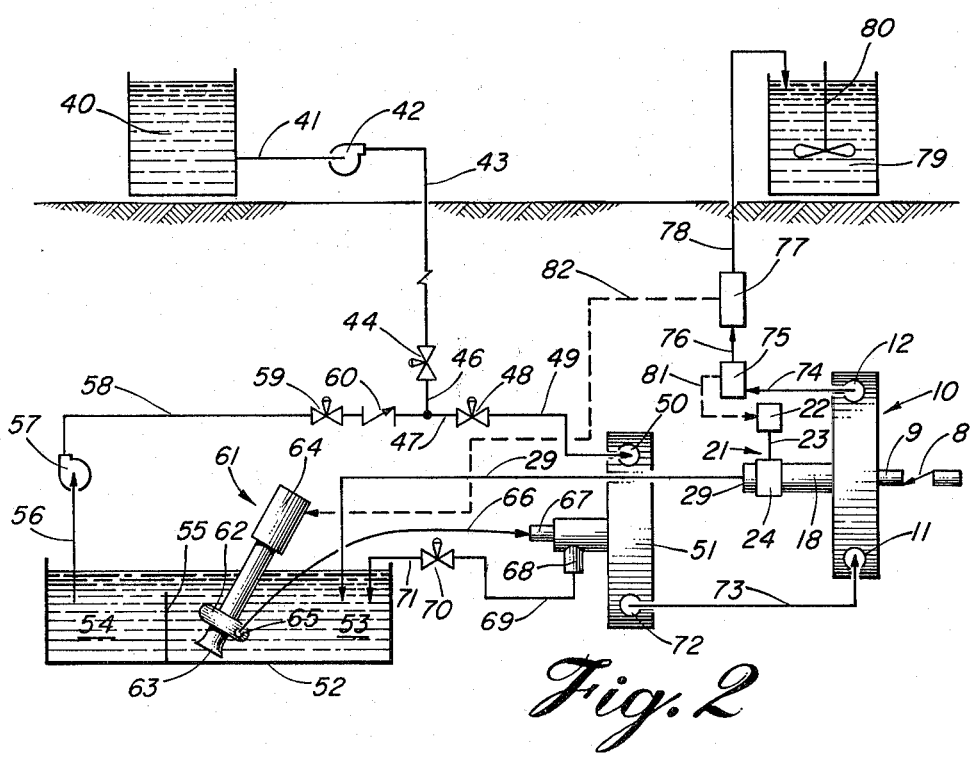

Referring to the process illustrated in FIG. 2, an application of the slurry concentration apparatus is illustrated where a control of the concentration of materials being pumped from a mine improves the efficiency of a hoisting operation. In this example, a surface fluid reservoir 40 is connected through a pipe 41 to a pump 42 which is in turn connected to a pipe 43 which conveys the fluid down hole for use in the transporta-tion operation. A control valve 44, which may be remotely controlled, is coupled through a pipe 46 and 47 to a second control valve 48 which is in turn coupled to pipe 49 to a high pressure inlet 50 of a vortex injection apparatus 51, previously referred to in application Ser. No. 218,857. A sump 52 is located below ground in a convenient location in a mine and is used for accommodating the input from several slurry systems and basically provides for the accommodation of fluids and materials from these several systems so that the material can be later pumped out of the mine at a high concentration and in a more efficient manner. The sump 52 comprises two sections 53 and 54. Section 53 confines the material being pumped from the mine face for eventual transportation out of the mine and generally includes water and the material being removed, such as coal, from the mine face. Section 53 also provides a means for separating excess water from the material being deposited into section 53 which flows over weir 55 to reservoir 54. The excess water is then pumped through a suction pipe 56 by means of a pump 57 and is discharged through pipe 58 to a control valve 59 and a check valve 60 to pipe 47.

In order to remove material from sump 52 a dredge 61 which comprises a pump 62 with a suction mouth 63 and motor 64 discharges its output at 65 through a flexible pipe 56 to a low pressure injection inlet 67 of vortex injector 51, moving through low pressure outlet 68 through pipe 69 and control valve 70 through pipe 71 where it is discharged into sump 52. The high pressure outlet 72 of vortex injector 51 is connected through a pipe 73 to the high pressure inlet 11 of slurry concentrator 10. The high pressure outlet 12 is coupled through a pipe 74 through a densitometer 75, out of densitometer 75 through pipe 76 and through a flow meter 77 to pipe 78 which conveys the concentrated slurry up hole to the surface of the mine where it is deposited into a temporary reservoir 79. A means for maintaining the particles in suspension may be provided, such as a stirring device 80. The check valve 8 is coupled through a pipe 9 to the interior of chamber 19 and provides for a vacuum relief inside the chamber. The output from densitometer 75 is coupled through a control circuit 81 to control unit 22. The output from flow meter 77 is coupled through a control means, such as a wire 82, to a control for pump 64, the control being of the type which will vary the speed of pump 64 in order to control concentration of coal to water forming a slurry which is applied to pipe 66 to vortex injector 51. The control circuits may also go to a computer for control determination.

Operation

The process illustrated in FIG. 2 operates as follows:

Coal, for example, from several mine faces is transported to sump 52 through a slurry system. Such slurry transportation systems are well known in the art and their operation and description will not be included here. Once the coal is deposited into section 53, it will normally be removed at a controlled rate by pump 61. Pump 61 operates by rotation of motor 64 and will couple power through a shaft (not shown) to a pump 62 which sucks material through mouth 63 and out of outlet 65 through flexible pipe 66 to the low pressure inlet of vortex injector 51. Vortex injector 51 operates by high pressure water being applied to inlet 50 moving around the circular cross-sectional chamber and exiting high pressure outlet 72. A certain amount of fluid is permitted to flow from high pressure outlet 50 to outlet 68. The fluid exiting outlet 68 causes a low pressure vortex to form along the axis of the outlet. The formation of the low pressure vortex permits the injection of low pressure slurry from flexible pipe 66 to the low pressure inlet 67. The slurry then gets entrained in the high pressure stream rotating around the chamber in vortex injector 51, causing the outlet 72 to be a mixture of fluid and slurry. The fluid to operate vortex chamber 51 is provided by reservoir 40 through pipe 41 and is increased in pressure by pump 42. Most of the pressure is generated by the weight of the fluid in pipe 43 which is applied through control valves 44, 46 and 47, control valve 48 through pipe 49 to high pressure injector inlet 50. As previously explained, some fluid will exit from outlet 69 in order to form a low pressure region in the chamber of vortex injector 51. Makeup fluid is provided by sucking fluid from 54 of sump 52 by pump 57 which is then supplied through pipe 58, control valve 59, and check valve 60 to pipe 47. Check valve 60 prevents fluid from moving from pipe 46 to the sump 54. Once the slurry is injected through pipe 66 to inlet 67 entrained in the fluid in the chamber of 51, it is then outputted through high pressure output 72 into pipe 73 and injected into high pressure inlet 11 of slurry concentration 10. The slurry is then moved to the output 12 through pipe 74 through densitometer 75. If the concentration is too low, as being measured by densitometer 75, a signal is sent through control unit 81 to control unit 22 of valve 21 which in turn will send a communication through control output 23 to valve body 24 causing the hydraulic fluid or air pressure to be removed from chamber 33 allowing the rubber sleeve 25 to become less restricted. The amount of reduction will depend upon how low the concentration is compared to the desired concentration. If densitometer 75 determines that the concentration is too high, a signal through control means 81 to control unit 22 will signal through control output 23 to valve body 24 to cause chamber 33 to fill with fluid (or air) causing the rubber sleeve to become further restricted, thereby closing the rubber sleeve and reducing the amount of fluid which is passing out of pipe 29 into section 53. This reduction will cause an increase in the fluid to coal ratio.

In case a vacuum develops during this operation, air can enter check valve 8 and pipe 9 to the interior of the chamber 19 providing a means for returning the chamber to outside air pressure. A flow meter 77 may also be provided which can further control concentration by varying the rate at which motor 64 is rotated, thereby providing more or less fluid to coal as the dredge is being moved in section 53.

Conclusions

A particular type of valve 21 has been disclosed. This valve is particularly useful since it has a high wear quality when slurry is passing through it and it does not tend to plug as easily as other types of valves when slurry passes through it. Furthermore, the valve tends to close uniformly diametrically, since fluids in pipe 18 are rotating around pipe 18 at a high velocity. The closing of the valve diametrically provides a uniform method for controlling the pressure in pipe 18. Other type valves which would tend to close only one section of the pipe as it is being used would tend to have a high degree of wear and not operate as efficiently in the particular type stream flowing down pipe 18; however, such type valves are not to be precluded though their function is substandard as they would still function in the invention.

It is obvious that other modifications and changes can be made in the application and still be within the spirit and scope of the invention as disclosed in the specification and appended claims.

What is claimed is:

1. An apparatus for increasing the solids to fluid ratio in a slurry comprising:
    (a) a chamber having a substantially circular cross section;
    (b) a high pressure slurry inlet mounted through said chamber and having an axis tangential to the circumference of said chamber circular cross section;
    (c) a high pressure slurry outlet mounted through said chamber and wherein said slurry outlet axis is tangential to the circumference of said chamber circular cross section;
    (d) a low pressure outlet means mounted through said chamber with its axis substantially parallel with the axis substantially parallel with the axis of said chamber circular cross section in a manner to cause a portion of the fluid entering said chamber high pressure inlet to flow to said low pressure outlet forming a vortex inside said chamber;
    (e) valve means inserted in said low pressure outlet means to regulate the quantity of fluids leaving said low pressure outlet; and
    (f) anticavitation means mounted through said chamber for permitting the passage of air into said vortex when the air pressure in said vortex is less than the air pressure outside said chamber.

2. Apparatus as described in claim 1 wherein the axis of the high pressure slurry inlet and high pressure slurry outlet are tangential to the same diameter.

3. Apparatus as described in claim 1 or 2 wherein the anticavitation means comprises a low pressure inlet mounted through said chamber along the axis of said vortex and a check valve mounted across said inlet whereby when said air pressure in said vortex drops below the outside air pressure, said check valve will open causing air to pass into said chamber at said vortex.

4. An apparatus as described in claim 1 or 2 including:
    (a) means having control input for automatically operating said valve means;
    (b) slurry concentration measuring means drawing an input means sensing the slurry concentration from said high pressure outlet means and developing an output signal corresponding to said concentration; and
    (c) means coupling said output signal to said control input means whereby said valve means will open by an amount corresponding to the decrease in concentration from a desired concentration of said slurry and close when said concentration increases over said desired concentration of said slurry.

5. Apparatus as described in claim 1 or 2 wherein said valve means comprises a housing having an internal rubber sleeve means and controllable pressure means for expanding or retracting said expandable rubber sleeve means to close or open said valve respectively.

6. A method of removing fluid from a slurry formed of solids and fluids to increase the concentration of solids in said slurry comprising:
    (a) injecting said slurry tangentially into a zone having a circular cross section;
    (b) removing tangentially said slurry from said zone through an outlet; and removing a portion of the fluid from injected slurry along an axis of said zone whereby said removed fluid will cause an increase in the concentration of solid-to-fluid ratio in said slurry.

7. A method of concentrating the solids to liquids ratio as described in claim 6 by determining the concentration of solids to liquids in said outlet and controllably removing a portion of said injected liquid along the axis of said zones, such portion being in inverse proportion to the measured concentration.

8. The method of concentrating the solids to liquids ratio as described in claim 6 or 7 additionally including the step of adding a gas to the axis of said zone to maintain said zone at substantially atmospheric pressure.

9. An apparatus for concentrating slurry from a sump which has a slurry section containing solids and water and a water separation section, dredge means mounted in said slurry section for removing said slurry and communicating said output to a slurry concentration regulation apparatus comprising:
    (a) a chamber with a substantially circular cross section and having a high pressure inlet and outlet means mounted through said chamber, each having its axis tangent to a diameter of said chamber and means coupling said high pressure inlet means to said communication means from said dredge means;
    (b) a low pressure outlet means mounted through said chamber having the axis of said outlet means parallel to the axis of said chamber and centrally located in order to form a vortex with the slurry when injected into the high pressure inlet means;
    (c) valve means mounted across said low pressure outlet, said valve means having a control means for operating said valve, said control means having a signal input;
    (d) means coupling the output from said valve to said sump;
    (e) concentration measuring means having an input mounted at said high pressure outlet means and generating a signal output corresponding to the measured concentration; and
    (f) means coupling said measuring means signal output to the signal input of said valve means whereby said slurry will be maintained at a substantially uniform concentration.

* * * * *